United States Patent
Trachewsky et al.

(10) Patent No.: US 7,535,978 B2
(45) Date of Patent: *May 19, 2009

(54) ACCURATE SIGNAL DETECTION IN A WIRELESS ENVIRONMENT

(75) Inventors: Jason A. Trachewsky, Menlo Park, CA (US); Alan Corry, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/020,478

(22) Filed: Jan. 25, 2008

(65) Prior Publication Data

US 2008/0118011 A1 May 22, 2008

Related U.S. Application Data

(63) Continuation of application No. 10/817,542, filed on Apr. 2, 2004, now Pat. No. 7,349,499.

(51) Int. Cl.
*H04L 27/06* (2006.01)

(52) U.S. Cl. .................................................. 375/343

(58) Field of Classification Search ................ 375/142, 375/143, 150, 152, 343, 349, 350; 342/108, 342/145, 189, 378; 704/216, 218, 237, 263; 708/5, 422, 813
See application file for complete search history.

(56) References Cited

U.S. PATENT DOCUMENTS

2004/0076246 A1* 4/2004 Vanderperren et al. ...... 375/343
2004/0190560 A1* 9/2004 Maltsev et al. .............. 370/503

* cited by examiner

*Primary Examiner*—Sam K Ahn
(74) *Attorney, Agent, or Firm*—Garlick Harrison & Markison; Jessica W. Smith

(57) ABSTRACT

A method for accurate signal detection begins by receiving a radio frequency signal, which is then converted into baseband signals. The processing then continues by performing a normalized auto correlation on the down-converted baseband signal to produce a normalized auto correlation signal. The process continues by performing a periodic pattern detection on the down-converted baseband signal to produce a normalized detected periodic signal. The process then continues by comparing the normalized auto correlation value with an auto correlation threshold and by comparing the normalized detected periodic signal with a set of thresholds. When the normalized auto correlation value compares favorably with the auto correlation threshold and when the normalized detected periodic signal compares favorably with the set of thresholds, the down-converted baseband signal is indicated to be a valid signal.

18 Claims, 7 Drawing Sheets digital receiver processing module 64 valid signal detection invalid signal detection signal detection module 102

ACCURATE SIGNAL DETECTION IN A WIRELESS ENVIRONMENT

CROSS REFERENCE TO RELATED APPLICATIONS

The present U.S. Utility Patent Application claims priority pursuant to 35 U.S.C. § 120, as a continuation, to the following U.S. Utility Patent Application which is hereby incorporated herein by reference in its entirety and made part of the present U.S. Utility Patent Application for all purposes:

U.S. Utility application Ser. No. 10/817,542, entitled "Accurate Signal Detection in a Wireless Environment,", filed Apr. 2, 2004, which claims priority as a continuation-in-part application to U.S. Utility application Ser. No. 10/757,931, now U.S. Pat. No. 7,181,187, entitled "RF Transmitter Having Improved Out of Band Attenuation,", filed Jan. 15, 2004.

BACKGROUND OF THE INVENTION

1. Technical Field of the Invention

This invention relates generally to wireless communication systems and more particularly to accurate signal detection by wireless communication devices operating in such wireless communication systems.

2. Description of Related Art

In a wireless communication system, wireless communication devices are constantly listening to one or more wireless communication resources (e.g., radio frequency (RF) channels) to determine whether they are intended recipients of a wireless communication. In a wireless local area network (WLAN) as defined by standards, such as IEEE802.11a, b, g, Bluetooth, et cetera, wireless communication devices monitor RF frequencies for a prescribed preamble. Typically, when the wireless communication devices are in the monitoring mode (i.e., seeking the preamble), they are in a limited operational state to reduce power consumption. When the prescribed preamble is detected, the wireless communication device becomes fully operational and thus is consuming more power.

To detect a valid IEEE802.11a or g preamble, wireless communication devices employ an auto correlation function to compare receive signals (i.e., received RF signals down-converted to baseband signals) with a delayed representation of the received signals. As is known, an IEEE802.11 wireless communications are packet-based where each packet includes a preamble and data. The preamble includes a plurality of repetitive short training sequences (STS) followed by a guard interval (GI), which is followed by a plurality of long training sequences (LTS). If valid short training sequences (STS) are being received, the auto correlation circuit is effectively comparing one STS to another to determine the validity of STS being received. If the auto correlation indicates that a valid STS series is being received, it continues the validation process by performing an auto-correlation on the long training sequences (LTS). If the received signal passes both STS and LTS auto correlations, then the signal is deemed to be valid.

While such auto correlation works to detect valid signals, it sometimes falsely detects interfering signals or adjacent channel signals as valid signals. When this occurs, the wireless communication device is fully activated and thus consumes power unnecessarily. In addition, such false positive detections limits data throughput of the wireless communication device since it is processing invalid data.

Therefore, a need exists for a method and apparatus that accurately detects the presence of valid signals.

BRIEF SUMMARY OF THE INVENTION

The accurate signal detection in a wireless communication environment of the present invention substantially meets these needs and others. In one embodiment, a method for accurate signal detection begins by receiving a radio frequency signal, which is then converted into baseband signals. The processing then continues by performing a normalized auto correlation on the down-converted baseband signal to produce a normalized auto correlation signal. The process continues by performing a periodic pattern detection on the down-converted baseband signal to produce a normalized detected periodic signal. The process then continues by comparing the normalized auto correlation value with an auto correlation threshold and by comparing the normalized detected periodic signal with a set of thresholds. When the normalized auto correlation value compares favorably with the auto correlation threshold and when the normalized detected periodic signal compares favorably with the set of thresholds, the down-converted baseband signal is indicated to be a valid signal. With such a method and apparatus, false-positive detection of invalid signals is substantially eliminated thus conserving power and improving data throughput of wireless communication devices.

In another embodiment, a method for accurate signal detection begins by receiving a radio frequency signal and down converting it to a baseband signal. The process continues by performing a periodic pattern detection on the down-converted baseband signal to produce a normalized detected periodic signal. The processing continues by comparing the normalized detected periodic signal with a set of thresholds. When the normalized detected periodic signal compares favorably with the set of thresholds, the down-converted baseband signal is deemed to be valid. With such a method and apparatus, false detections of invalid signals is substantially overcome thereby reducing power consumption by wireless communication devices and improving data throughput.

DETAILED DESCRIPTION OF THE INVENTION

Figure 1:
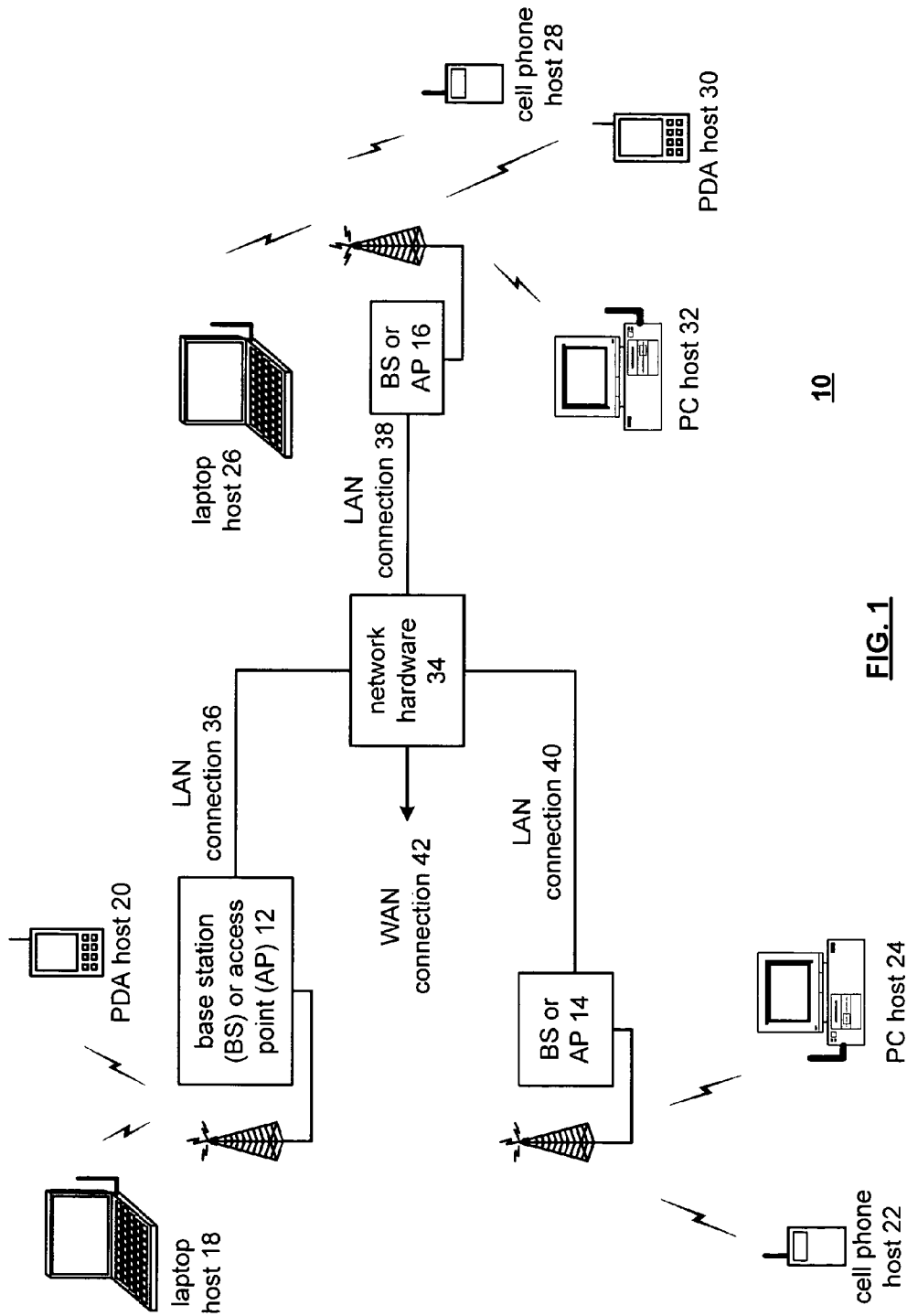
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34.

The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
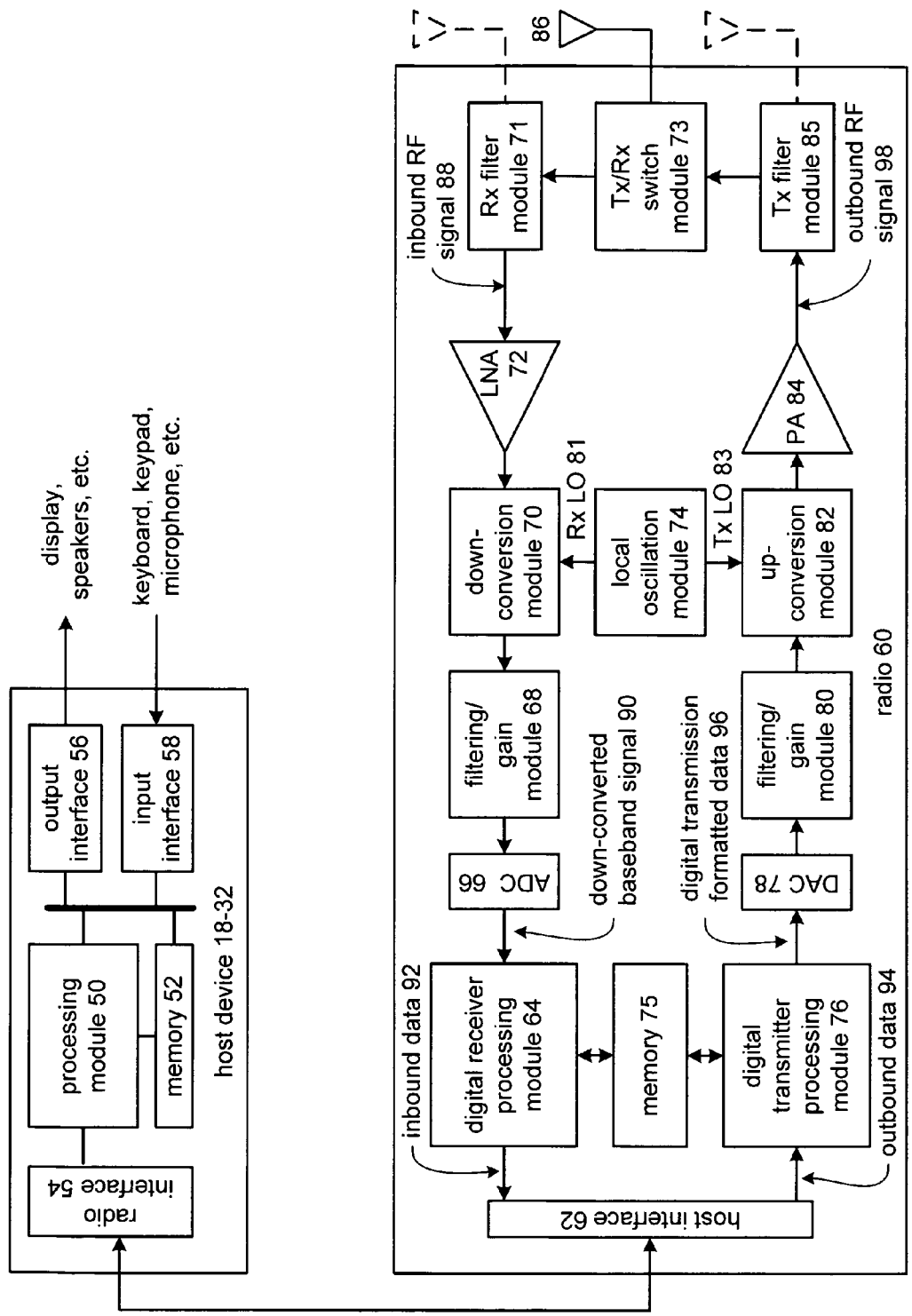
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce down-converted baseband signal 90. The digital receiver processing module 64 decodes, descrambles, demaps, and/or demodulates the down-converted baseband signal 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
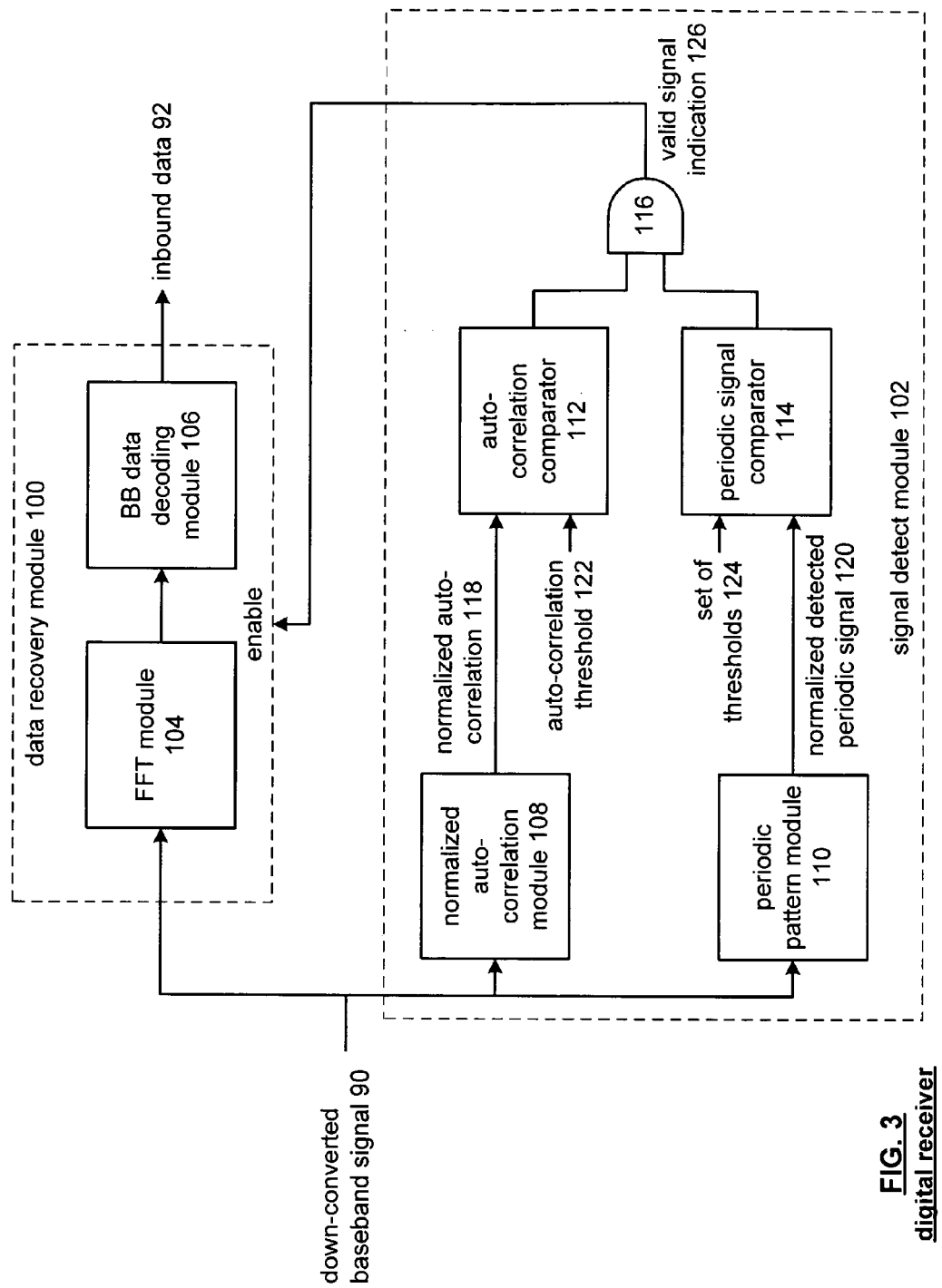
FIG. 3 is a schematic block diagram of the digital receiver processing module in accordance with the present invention.

FIG. 3 is a schematic block diagram of the digital receiver processing module 64 including a signal detection module 102 and a data recovery module 100. The signal detection module 102 includes a normalized auto correlation module 108, a periodic pattern module 110, an auto correlation comparator 112, a periodic signal comparator 114 and an AND gate 116. The data recovery module 100 includes a fast Fourier transform (FFT) module 104 and a baseband data decoding module 106. If the wireless communication device is implemented in accordance with IEEE802.11, the baseband decoding module 106 may include one or more of a demapping and deinterleaving module, a forward error correction decoder, and may further include a guard interval removal module prior to the FFT module 104.

In operation, the data recovery module 100 converts the down-converted baseband signals 90, which are complex signals including in-phase components and quadrature components, into inbound data 92 by performing a fast Fourier transform upon the baseband signals 90 and then subsequent baseband decoding. The fast Fourier transform and subsequent baseband decoding are not initiated until an enable signal is provided by the signal detect module 102. In this manner, the wireless communication device may remain in a low power mode until a valid signal indication is provided to the data recovery module 100, which then awakens the circuitry in the receiver portion of the wireless communication device to accurately recover the data 92 from received RF signals.

To produce the valid signal indication 126, the signal detection module 102 performs a periodic pattern detection via the periodic pattern detection module 110 and the periodic signal comparator 114. As an alternate addition, the signal detection module 102 may further perform a normalized auto correlation via the normalized auto correlation module 108 and the auto correlation comparator 112. In general, the periodic pattern module 110 passes the down-converted baseband signals 90 through a match filter, which may be a fast impulse response (FIR) digital filter wherein the coefficients are set in accordance with a valid repetitive pattern of a preamble. For instance, with respect to IEEE802.11, the repetitive preamble pattern includes short training sequences and long training sequences. Thus, for an 802.11 application, the match filter coefficients would be set initially based on the short training sequence and then subsequently based on the long training sequence. Effectively, the match filter compares the down-converted baseband signal 90 with the pattern of the known preamble. Note that the down-converted baseband signal 90 is normalized to a particular power level prior to passing it through the match filter.

If the baseband signal 90 includes a valid preamble, the normalized detect period signal 120 will include a plurality of pulses corresponding to the period of the repetitive pattern of the preamble. This will be illustrated in greater detail with reference to FIGS. 4 and 5. The normalized detected periodic signal 120 is then compared with a set of thresholds 124 by the periodic signal comparator 114. The set of thresholds 124 includes a $1^{st}$ threshold to indicate whether the peaks of the normalized detected periodic signal 120 exceed a particular threshold. If not, the normalized detected periodic signal is an invalid signal and a corresponding invalid output will be produced. If the peaks of the normalized detected periodic signal 120 exceed the $1^{st}$ threshold, then the normalized detected periodic signal is compared with a $2^{nd}$ and $3^{rd}$ threshold. The $2^{nd}$ threshold is used to compare the peaks of the normalized detected circuit with the valleys of the normalized detected periodic signal. This comparison indicates that the resulting waveform from the matched filter has peaks and valleys in an anticipated pattern for a valid preamble. The $3^{rd}$ threshold is used to compare the periodic nature of the normalized detected periodic signal. If the signal is valid, the peaks of the normalized detected periodic signal 120 should be substantially similar in magnitude and duration. Again, this will be further described with reference to FIGS. 4 and 5.

If the signal detection module 102 only performs the periodic pattern detection, the output of the periodic signal comparator 114 provides the valid or invalid signal indication 126. If, however, the signal detection module 102 further performs an auto correlation function, the normalized auto correlation module 108 produces a normalized auto correlation 118. The normalized auto correlation includes normalizing the magnitude of the baseband signals 90 to a nominal value and then performing the auto correlation of the normalized baseband signals 90. The particulars of auto correlation are known thus no further discussion of the functionality of auto correlation will be provided except to further illustrate the concepts of the present invention.

The auto correlation comparator 112 compares the normalized auto correlation 118 with an auto correlation threshold 122. As is known, if auto correlation is occurring (i.e., a delayed representation of the signal substantially matches a previous representation of the signal), the normalized auto correlation 118 will rise in magnitude. Once the normal auto correlation signal 118 rises above the auto correlation threshold 122, the auto correlation comparator 112 produces a logic 1 output. If both the auto correlation comparator 112 and periodic signal comparator 114 indicate that the signal is valid, AND gate 116 ANDs the values together to produce the corresponding signal indication 126.

Figure 4:
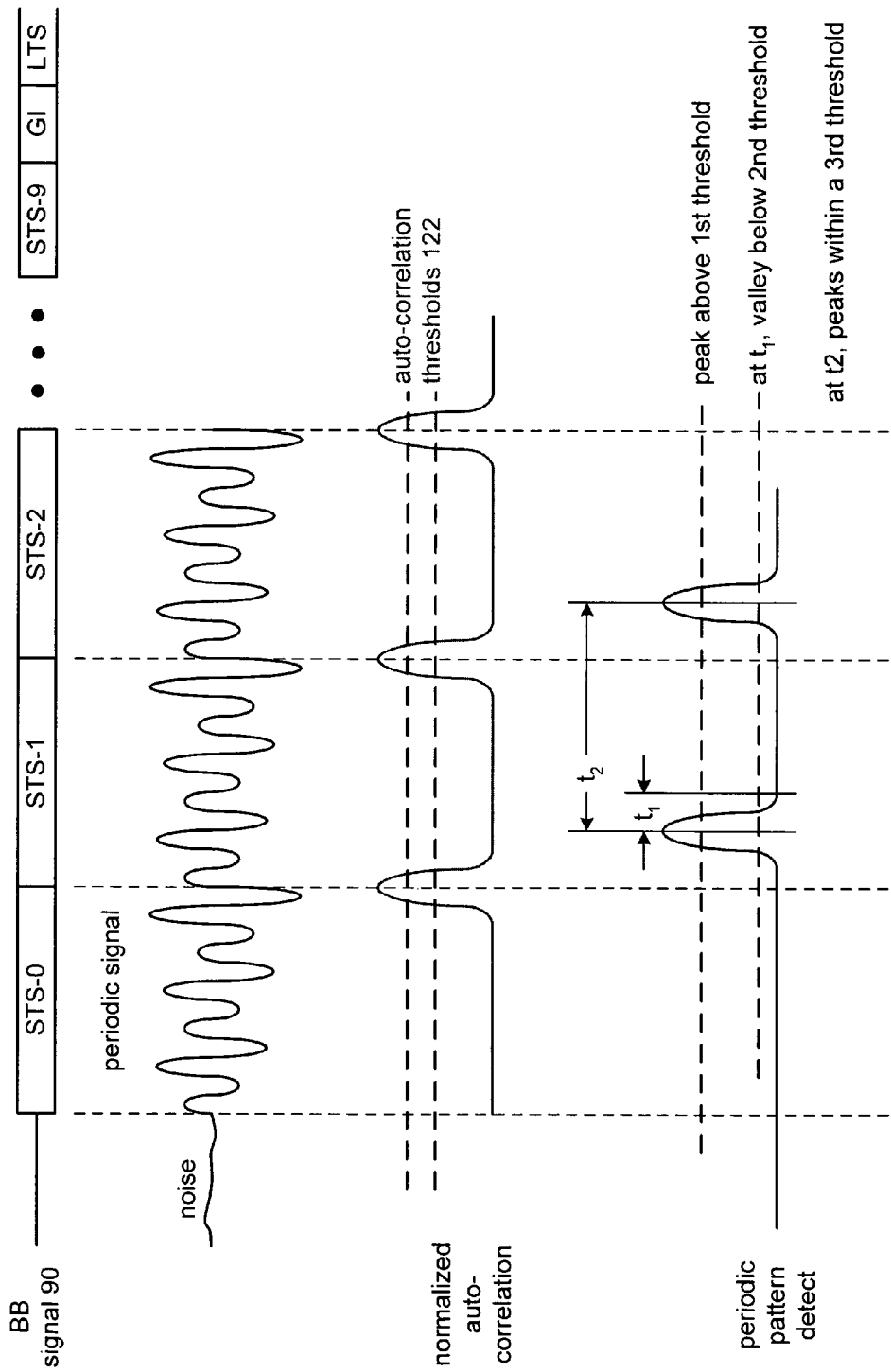
FIG. 4 is a graphical representation of valid signal detection in accordance with the present invention.

FIG. 4 illustrates a graphical representation of detecting a valid signal via its preamble. In this example, the preamble corresponds to the preamble of an IEEE802.11 wireless transmission packet. As shown, the baseband signal 90 is initially zero and then begins to transmit the preamble that includes a plurality of short training sequences (STS), followed by a guard interval (GI), followed by long training sequences (LTS). The next line illustrates an analog representation of the baseband signal 90, at least with respect to the in-phase component or quadrature component of baseband signal 90. As shown, prior to the short training sequence being initiated, the baseband signal 90 includes noise. Once the short training sequence is being received, it is a periodic signal. The periodic signal illustrated in FIG. 4 is merely a simplified representation of the STS to illustrate the periodic nature of the short training sequence and not an accurate representation of the STS. As shown, from interval-to-interval of the short training sequence, the periodic signal is the same for short training sequence 0, short training sequence 1, et cetera.

The normalized auto correlation function is shown next with respect to an auto correlation threshold. For the $1^{st}$ short training sequence, the periodic signal is effectively compared against the noise. Since the pattern of the noise does not match the pattern of the periodic signal of the short training sequence, the normalized auto correlation value is low. For the next short training sequence (STS-1), it is effectively being compared with the periodic nature of the $1^{st}$ short training sequence (STS-0). Since these periodic signals of the short training sequence 0 and 1 substantially match, the normalized auto correlation value increases. Once the value increases above the auto correlation threshold 122, it is indicative that the baseband signal 90 is potentially a valid signal.

To enhance the accuracy of signal detection, the periodic pattern detection produces a wave form that includes a series of peaks occurring at the period of the short training sequences. As shown, the baseband signal is passed through a match filter, with its coefficients set to replicate the normalized periodic signal of the short training sequences. As such, as the short training sequence signal passes through the match filter, a peak will occur at substantially the center of the period of the short training sequence. This is illustrated by the peak. The peak is then compared with a $1^{st}$ threshold. If the peak exceeds the threshold the periodic pattern is then compared with a $2^{nd}$ threshold which indicates whether the valley is, at time $T_1$, below the $2^{nd}$ threshold. If this is the case, then the next occurrence of the peak, at $T_2$, is compared with a $3^{rd}$ threshold. Accordingly, the $3^{rd}$ threshold comparison is determining whether the magnitude of the peaks is substantially similar. If a truly valid signal is being received, the peaks from one period to the next should be substantially identical.

When the signal passes both the normal audio correlation and the periodic pattern detection, the signal is deemed valid. To further enhance the validity of signal detection, the normalized auto correlation and periodic pattern detection may be further performed on the long training sequences in a similar manner. For the long training sequences, the coefficients of the match filter will be altered to replicate the normalized periodic signal of the long training sequence.

Figure 5:
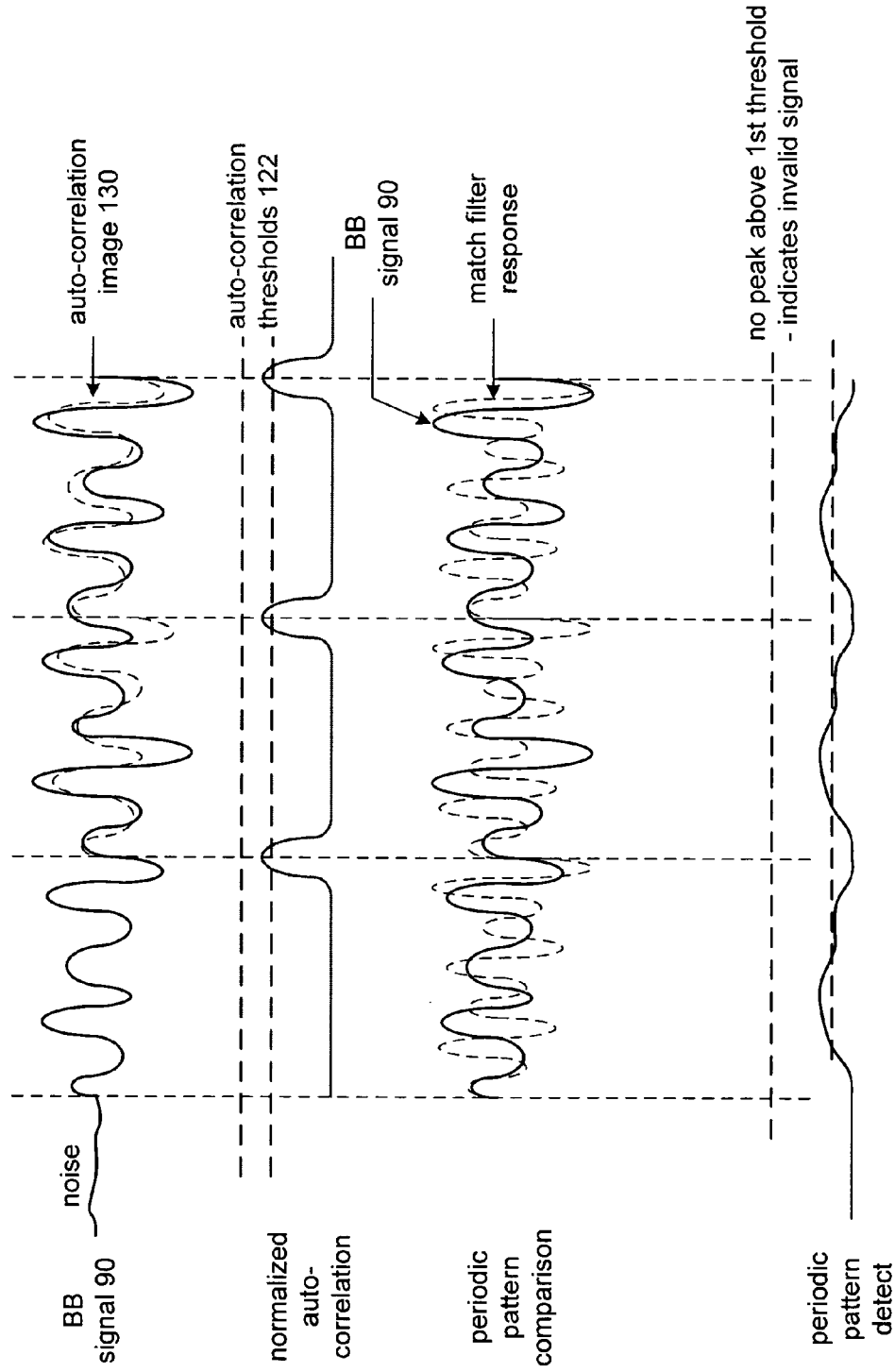
FIG. 5 is a graphical representation of invalid signal detection in accordance with the present invention.

FIG. 5 is a graphical representation of detecting an invalid signal. In this instance, the baseband signal initially begins with noise and then includes a somewhat periodic signal. Such a baseband signal 90 may occur by receiving an undesired adjacent channel that may have a 25 megahertz channel bandwidth as compared to a desired channel bandwidth of 20 megahertz. The illustration also provides the periods indicated by the vertical dash lines corresponding to the period of a valid preamble as illustrated in FIG. 4. In this illustration of FIG. 5, the baseband signal 90 does not have a period that corresponds with the boundaries of the short training sequence of FIG. 4, which provides the boundaries for the auto correlation. In intervals 2 and 3 of a valid short training sequence, the auto correlation image 130 is illustrated as the dash lines (i.e., this is the effective signal that is being compared to the actual received signal during the given interval and corresponds to a valid short training sequence). Accordingly, if the baseband signal 90 were a valid signal including the short training sequences, the auto correlation image 130 would substantially match the actual signal. In this case however, since the baseband signal 90 does not include a valid short training sequence, the auto correlation image 130 does not substantially match the actual baseband signal 90.

Even though the auto correlation image 130 does not substantially match the baseband signal 90, there are enough similarities that the normalized auto correlation function may falsely trigger. This is illustrated in the subsequent line where the normalized auto correlation increases above the auto correlation threshold 122 and, without the periodic pattern comparison, would provide a false-positive signal detection. In a comparison with FIGS. 4 and 5, it is noted that the normalized auto correlation of FIG. 4 substantially exceeds the auto correlation threshold 122 while in FIG. 5 it barely exceeds the auto correlation threshold since the auto correlation image 130 is not substantially identical to a valid STS.

The next portion of FIG. 5 illustrates the periodic pattern comparison. The solid line represents the baseband signal 90 while the dash line represents the match filter response, which corresponds to the periodic signal of a valid short training sequence. By comparing the match filter response with the baseband signal response, which is done by passing the baseband signal 90 through a match filter, the resulting periodic pattern detection no peaks that exceed the $1^{st}$ threshold as were obtained in FIG. 4. Since no peaks are obtained, the signal is deemed to be invalid and a corresponding output is produced.

As one of average skill in the art will appreciate, the illustration in FIG. 5 provides that no peaks are established via the periodic pattern comparison. However, the periodic comparison may produce a periodic pattern detection value that constantly exceeds the $1^{st}$ threshold or randomly exceeds the threshold. In this instance, the $2^{nd}$ threshold would then be compared to determine whether the valleys are sufficiently low as would be expected in a valid signal. If the test fails this parameter, the signal is again deemed to be invalid. Further, if the periodic pattern detection passes the $1^{st}$ two thresholds, the $3^{rd}$ threshold is tested to determine whether the peaks are occurring at the anticipated points in time. If not, the signal is again deemed to be invalid.

Figure 6:
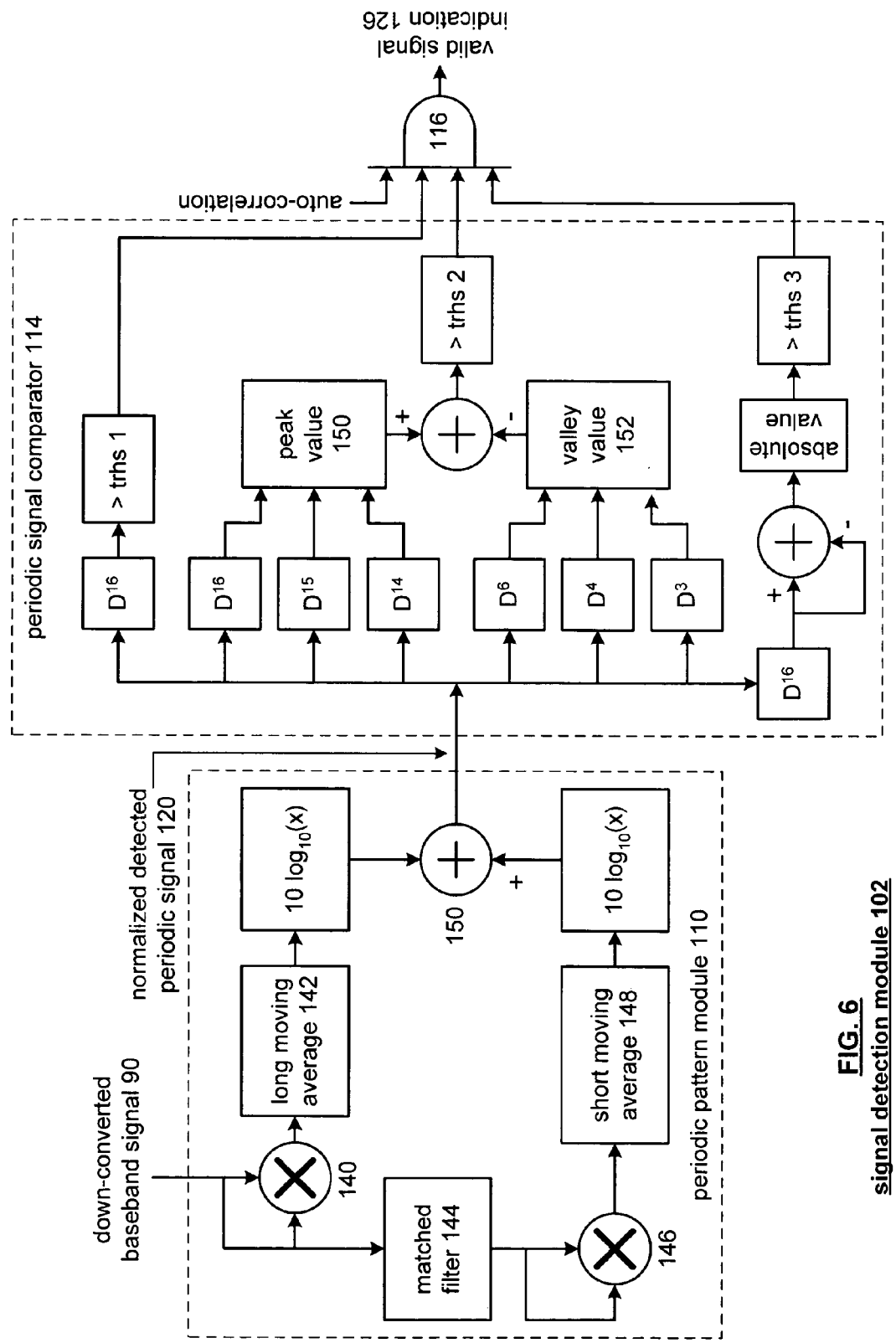
FIG. 6 is a schematic block diagram of a signal detection module in accordance with the present invention.

FIG. 6 illustrates a more detailed schematic block diagram of the signal detection module 102 that includes the periodic pattern module 110 and the periodic signal comparator 114. The periodic pattern module 110 includes a multiplier 140, a long moving average 142, a logarithmic module, a subtraction module 150, a match filter 144, a multiplier 146, a short moving average 148 and another logarithmic module. The periodic signal comparator 114 includes a plurality of delay lines ($D^{0-16}$), a $1^{st}$ threshold comparator, a peak value module 150, a subtraction module, a valley value module 152, a $2^{nd}$ threshold comparator, a multiplier, an absolute value module and a $3^{rd}$ threshold comparator.

The periodic pattern module 110 receives the down-converted baseband signal 90 via the multiplier 140. The multiplier 140 multiplies the baseband signal 90 with itself to perform a complex conjugate function such that the complex baseband signal 90, when multiplied with itself, produces a real value. In addition, the match filter 144 receives the down-converted baseband signal 90. The output of multiplier 140 is provided to the long moving average 142 which averages the baseband signal 90 over at least one period of the short training sequence. The value is then converted into a logarithmic value such that it can be subtracted from the resulting short term moving average 148 as opposed to divided function.

The match filter 144, which has its coefficients set to replicate the desired short training sequence, produces a peak output that is a complex signal that when multiplied via multiplier 146 produces a real value. The short moving average 148 averages a few sample points which are then converted into a log value. The subtraction module 150 subtracts the long moving average, which is the average of the baseband signal, from the peak of the match filter results to produce the normalized detected periodic signal 120 as shown in FIGS. 4 and 5.

The periodic signal comparator 114 produces a plurality of delayed representations of the normalized detected periodic signal 120 via a 16×8 delay line. A one period delay, which is produced by delay $D^{16}$ is then compared with the $1^{st}$ threshold as previously described. The output of the threshold comparison is then provided to the input of AND gate 116. The comparison of the $2^{nd}$ threshold, (i.e., the peak value with the valley value) is determined by selecting one of the delayed sample representations via delay element $D^{16}$, $D^{15}$, or $D^{14}$ (e.g., the largest value). The resulting peak value is then provided to the subtraction module. The valley value is selected from one of the delayed representations produced by delay $D^6$, $D^4$, or $D^3$ (e.g., the smallest value). The resulting subtraction of the valley value from the peak value is then compared with the $2^{nd}$ threshold as graphically illustrated in FIG. 4.

The one period delayed representation of the normalized detected periodic signal 120 is compared with a current representation via the subtraction module. The resultant, which for a valid signal should be near zero, is provided through an absolute value module wherein the absolute value is then compared with threshold 3. This was graphically illustrated in FIG. 4.

The AND gate 116 is shown to include 4 inputs: one corresponding to the resultant of the auto correlation and the other three produced by the periodic signal comparator 114. Note that the inputs to AND gate 116 may be selectable such that the valid signal indication 126 may be the resultant of all 4 inputs, only the inputs produced by the signal comparator 114 or a subset of the comparisons performed by the periodic signal comparator 114.

Figure 7:
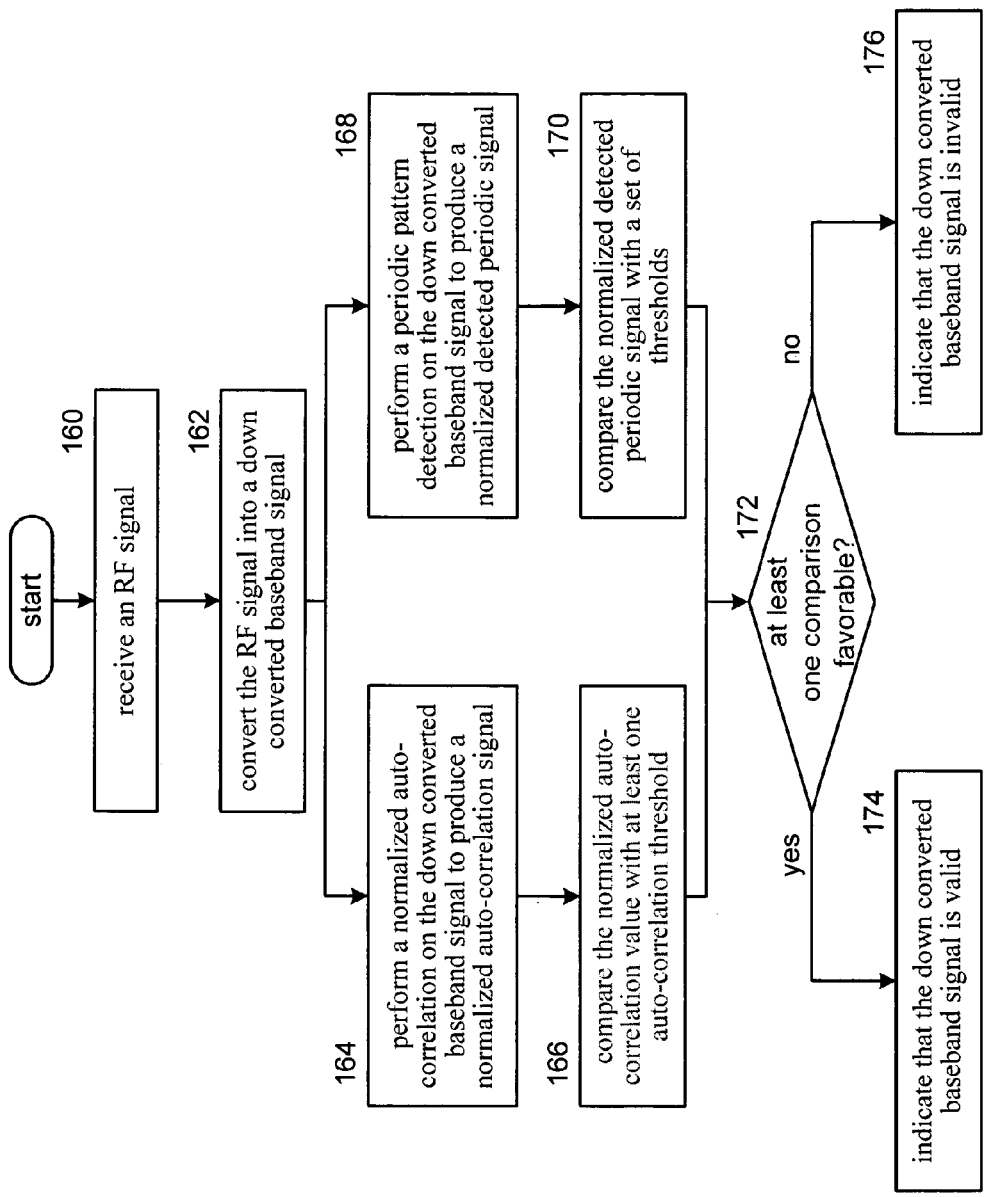
FIG. 7 is a logic diagram of a method for accurate signal detection in a wireless communication environment in accordance with the present invention.

FIG. 7 is a logic diagram of a method for accurate signal detection. The process begins at Step 160 where a radio frequency signal is received. The process then proceeds to Step 162 where the RF signal is converted into a down-converted baseband signal. The process then branches to Step 164 and 168, where the functioning beginning at Step 168 corresponds to the periodic pattern detection and functions beginning at Step 164 correspond to the normalized auto correlation function. Note that in one embodiment of the accurate signal detection of the present invention, Steps 164 and 166 may be omitted.

At Step 164, a normalized auto correlation is performed on the down-converted baseband signal to produce a normalized auto correlation signal. The process then proceeds to Step 166 where the normalized auto correlation value is compared with an auto correlation threshold. This was graphically illustrated in FIGS. 4 and 5.

At Step 168, a periodic pattern detection is performed on the down-converted baseband signal to produce a normalized detected periodic signal. The process then proceeds to Step 170 where the normalized detected periodic signal is compared with a set of thresholds. This was graphically illustrated and discussed with reference to FIGS. 4 and 5.

The process then proceeds to Step 172 as to whether the comparison or comparisons were favorable. If not, the process proceeds to Step 176 where an indication is provided that the down-converted baseband signal is invalid. If the comparisons were favorable, the process proceeds to Step 174 where the down-converted baseband signal is indicated to be valid.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. The preceding discussion has presented a method and apparatus for accurate signal detection in a wireless communication environment. By further performing a periodic pattern detection as previously described, the accuracy of signal detection is enhanced such that wireless communication devices power consumption is reduced and data throughput is increased. As one of average skill in the art will appreciate, other embodiments may be derived from the teaching of the present invention without deviating from the scope of the claims.

What is claimed is:

1. A method for accurate signal detection by a receiver section in a wireless environment, comprising:
   receiving a radio frequency (RF) signal;
   converting the RF signal into a down converted baseband signal;
   performing a periodic pattern detection on the down converted baseband signal to produce a normalized detected periodic signal, wherein the performing the periodic pattern detection comprises:
      match filtering the down converted baseband signal to produce matched filtered signal, wherein coefficients of the match filtering correspond to a desired waveform of the down converted baseband signal;

convolving the matched filtered signal with the matched filtered signal to produce a squared absolute value of the matched filtered signal;

convolving the down converted baseband signal with the down converted baseband signal to produce a squared absolute value of the baseband signal; and comparing the squared absolute value of the matched filtered signal with the squared absolute value of the baseband signal to produce the normalized detected periodic signal;

comparing the normalized detected periodic signal with a set of thresholds; and when the normalized detected periodic signal compares favorably with the set of thresholds, indicating that the down converted baseband signal is valid.

2. The method of claim 1 further comprises:

performing a normalized auto-correlation on the down converted baseband signal to produce a normalized auto-correlation signal; and when the normalized auto-correlation value compares favorably with an auto-correlation threshold, indicating that the down converted baseband signal is valid.

3. The method of claim 1, wherein the comparing the squared absolute value of the matched filtered signal with the squared absolute value of the baseband signal comprises:

determining a moving average of the squared absolute value of the baseband signal over a first number of cycles to produce a reference moving average;

determining a moving average of the squared absolute value of the matched filtered signal over a second number of cycles to produce an instantaneous moving average, wherein the first number of cycles is greater than the second number of cycles;

performing a logarithmic function on the reference moving average to produce a reference moving average logarithmic;

performing the logarithmic function on the instantaneous moving average to produce an instantaneous moving average logarithmic; and subtracting the reference moving average logarithmic from the instantaneous moving average logarithmic to produce the normalized detected periodic signal.

4. The method of claim 1, wherein the comparing the normalized detected periodic signal with the set of thresholds comprises:

determining whether a peak of the normalized detected periodic signal exceeds a first threshold of the set of thresholds;

determining whether the peak of the normalized detected periodic signal exceeds a valley of the normalized detected periodic signal plus a second threshold of the set of thresholds;

determining whether a subsequent peak of the normalized detected periodic signal is approximately equal to the peak of the normalized detected periodic signal; and when the peak of the normalized detected periodic signal exceeds the first threshold of the set of thresholds, the peak of the normalized detected periodic signal exceeds the valley of the normalized detected periodic signal plus the second threshold of the set of thresholds, and the subsequent peak of the normalized detected periodic signal approximately equals the peak of the normalized detected periodic signal, determining that the normalized detected periodic signal compared favorably to the set of thresholds.

5. The method of claim 4, wherein the determining whether the peak of the normalized detected periodic signal exceeds the first threshold of the set of thresholds comprises:

delaying the normalized detected periodic signal by a known period of a valid baseband signal to identify an approximate peak of the normalized detected periodic signal; and utilizing the approximate peak as the peak of the normalized detected periodic signal.

6. The method of claim 4, wherein the determining the peak of the normalized detected periodic signal exceeds the valley of the normalized detected periodic signal plus the second threshold comprises:

selecting one of a plurality of approximate peaks of the normalized detected periodic signal as the peak of the normalized detected periodic signal;

selecting one of a plurality of approximate valleys of the normalized detected periodic signal as the valley of the normalized detected periodic signal;

subtracting the valley of the normalized detected periodic signal from the peak of the normalized periodic signal to produce a difference; and comparing the difference with the second threshold.

7. The method of claim 6 further comprises:

delaying the normalized detected periodic signal to produce a plurality of delayed signals;

selecting a first set of the plurality of delayed signals to provide the plurality of approximate peaks; and selecting a second set of the plurality of delayed signals to provide the plurality of approximate valleys.

8. The method of claim 4, wherein the determining whether the subsequent peak of the normalized detected periodic signal is approximately equal to the peak of the normalized detected periodic signal comprises:

delaying the normalized detected periodic signal by a known period of a valid baseband signal to provide the peak;

subtracting the peak from the subsequent peak to produce a difference;

computing an absolute value of the difference; and comparing the absolute value of the difference with the third threshold.

9. The method of claim 1 further comprises at least one of:

performing the auto-correlation and the periodic pattern detection on a short training sequence of the down converted baseband signal; and performing the auto-correlation and the periodic pattern detection on a long training sequence of the down converted baseband signal.

10. A radio frequency integrated circuit (RFIC) comprises:

a transmitter section operably coupled to convert outbound baseband data into outbound radio frequency (RF) signals;

a receiver section operably coupled to convert inbound RF signals into inbound baseband signals and to convert the inbound baseband signals into inbound data, wherein the receiver section includes:

a signal detection module operably coupled to determine whether the inbound baseband signals are valid by performing a periodic pattern detection on the inbound baseband signals to produce a normalized detected periodic signal; comparing the normalized detected periodic signal with a set of thresholds; and when the normalized detected periodic signal compares favorable with the set of thresholds, indicating that the down converted baseband signals are valid; and wherein the signal detection module further functions to perform the periodic pattern detection by match filtering the down converted baseband signal to produce matched filtered signal, wherein coefficients of the match filtering correspond to a desired waveform of the down converted baseband signal convolving the matched filtered signal with the matched filtered signal to produce a squared absolute value of the matched filtered signal; convolving the down converted baseband signal with the down converted baseband signal to produce a squared absolute value of the baseband signal; and comparing the squared absolute value of the matched filtered signal with the squared absolute value of the baseband signal to produce the normalized detected periodic signal.

11. The RFIC of claim 10, wherein the signal detection module further functions to:
perform a normalized auto-correlation on the inbound baseband signals to produce a normalized auto-correlation signal; and
when the normalized auto-correlation value compares favorably with an auto-correlation threshold, indicate that the inbound baseband signals are valid.

12. The RFIC of claim 10, wherein the signal detection module further functions to compare the squared absolute value of the matched filtered signal with the squared absolute value of the baseband signal by:
determining a moving average of the squared absolute value of the baseband signal over a first number of cycles to produce a reference moving average;
determining a moving average of the squared absolute value of the matched filtered signal over a second number of cycles to produce an instantaneous moving average, wherein the first number of cycles is greater than the second number of cycles;
performing a logarithmic function on the reference moving average to produce a reference moving average logarithmic;
performing the logarithmic function on the instantaneous moving average to produce an instantaneous moving average logarithmic; and
subtracting the reference moving average logarithmic from the instantaneous moving average logarithmic to produce the normalized detected periodic signal.

13. The RFIC of claim 10, wherein the inbound baseband signals comprises at least one of:
a short training sequence within a preamble of a frame of the inbound baseband signals; and
a long training sequence within a preamble of a frame of the inbound baseband signals.

14. A radio frequency integrated circuit (RFIC) comprises:
a transmitter section operably coupled to convert outbound baseband data into outbound radio frequency (RF) signals;
a receiver section operably coupled to convert inbound RF signals into inbound baseband signals and to convert the inbound baseband signals into inbound data, wherein the receiver section includes;
a signal detection module operably coupled to determine whether the inbound baseband signals are valid by performing a periodic pattern detection on the inbound baseband signals to produce a normalized detected periodic signal; comparing the normalized detected periodic signal with a set of thresholds; and when the normalized detected periodic signal compares favorable with the set of thresholds, indicating that the down converted baseband signals are valid; and
wherein the signal detection module farther functions to compare the normalized detected periodic signal with the set of thresholds by: determining whether a peak of the normalized detected periodic signal exceeds a first threshold of the set of thresholds; determining whether the peak of the normalized detected periodic signal exceeds a valley of the normalized detected periodic signal plus a second threshold of the set of thresholds; determining whether a subsequent peak of the normalized detected periodic signal is approximately equal to the peak of the normalized detected periodic signal; and when the peak of the normalized detected periodic signal exceeds the first threshold of the set of thresholds, the peak of the normalized detected periodic signal exceeds the valley of the normalized detected periodic signal plus the second threshold of the set of thresholds, and the subsequent peak of the normalized detected periodic signal approximately equals the peak of the normalized detected periodic signal, determining that the normalized detected periodic signal compared favorably to the set of thresholds.

15. The RFIC of claim 14, wherein the signal detection module further functions to determine whether the peak of the normalized detected periodic signal exceeds the first threshold of the set of thresholds by:
delaying the normalized detected periodic signal by a known period of a valid baseband signal to identify an approximate peak of the normalized detected periodic signal; and
utilizing the approximate peak as the peak of the normalized detected periodic signal.

16. The RFIC of claim 14, wherein the signal detection module further functions to determine the peak of the normalized detected periodic signal exceeds the valley of the normalized detected periodic signal plus the second threshold by:
selecting one of a plurality of approximate peaks of the normalized detected periodic signal as the peak of the normalized detected periodic signal;
selecting one of a plurality of approximate valleys of the normalized detected periodic signal as the valley of the normalized detected periodic signal;
subtracting the valley of the normalized detected periodic signal from the peak of the normalized periodic signal to produce a difference; and
comparing the difference with the second threshold.

17. The RFIC of claim 16, wherein the signal detection module further functions to:
delay the normalized detected periodic signal to produce a plurality of delayed signals;
select a first set of the plurality of delayed signals to provide the plurality of approximate peaks; and
select a second set of the plurality of delayed signals to provide the plurality of approximate valleys.

18. The RFIC of claim 14, wherein the signal detection module further functions to determine whether the subsequent peak of the normalized detected periodic signal is approximately equal to the peak of the normalized detected periodic signal by:
delaying the normalized detected periodic signal by a known period of a valid baseband signal to provide the peak;
subtracting the peak from the subsequent peak to produce a difference;
computing an absolute value of the difference; and
comparing the absolute value of the difference with the third threshold.

* * * * *

UNITED STATES PATENT AND TRADEMARK OFFICE
CERTIFICATE OF CORRECTION

PATENT NO. : 7,535,978 B2 Page 1 of 1
APPLICATION NO. : 12/020478
DATED : May 19, 2009
INVENTOR(S) : Jason A. Trachewsky and Alan Corry It is certified that error appears in the above-identified patent and that said Letters Patent is hereby corrected as shown below:

Column 12, line 67, in Claim 10: replace "signal" with --signal;--.

Column 13, line 61, in Claim 14: replace "farther" with --further--.

Signed and Sealed this

Thirtieth Day of June, 2009

JOHN DOLL
*Acting Director of the United States Patent and Trademark Office*